(12) United States Patent
Walton

(10) Patent No.: US 9,479,608 B2
(45) Date of Patent: ***Oct. 25, 2016

(54) PRELOADER EMPLOYING ENHANCED MESSAGES

(71) Applicant: AT&T Intellectual Property I, L.P., Atlanta, GA (US)

(72) Inventor: Denis Brent Walton, Pittsburg, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 345 days.

This patent is subject to a terminal disclaimer.

(21) Appl. No.: 14/293,937

(22) Filed: Jun. 2, 2014

(65) Prior Publication Data

US 2014/0280523 A1 Sep. 18, 2014

Related U.S. Application Data

(63) Continuation of application No. 11/948,354, filed on Nov. 30, 2007, now Pat. No. 8,745,507.

(51) Int. Cl.
*G06Q 30/02* (2012.01)
*G06F 17/30* (2006.01)
*H04L 29/08* (2006.01)

(52) U.S. Cl.
CPC ..... *H04L 67/2847* (2013.01); *G06F 17/30902* (2013.01)

(58) Field of Classification Search
CPC .......... G06F 17/30902; H04N 21/235; H04N 21/4331
See application file for complete search history.

(56) References Cited

U.S. PATENT DOCUMENTS

| | | |
|---|---|---|
| 6,237,022 B1 | 5/2001 | Bruck et al. |
| 6,272,493 B1 | 8/2001 | Pasquali |
| 6,317,780 B1 | 11/2001 | Cohn et al. |
| 6,535,882 B2 | 3/2003 | Pasquali |
| 6,549,914 B1 | 4/2003 | Valys |
| 6,615,251 B1 | 9/2003 | Klug et al. |
| 6,622,168 B1 | 9/2003 | Datta |
| 6,636,856 B2 | 10/2003 | Pasquali |
| 6,658,419 B2 | 12/2003 | Pasquali |
| 6,704,773 B1 | 3/2004 | Cohn et al. |
| 6,892,354 B1 | 5/2005 | Servan-Schreiber et al. |
| 7,000,180 B2 | 2/2006 | Balthaser |
| 7,269,626 B1 | 9/2007 | Nguyen |
| 7,647,550 B1 | 1/2010 | Nguyen |
| 2001/0044832 A1 | 11/2001 | Cohn et al. |
| 2001/0044846 A1 | 11/2001 | Cohn et al. |
| 2002/0004755 A1 | 1/2002 | Balthaser |
| 2002/0012010 A1 | 1/2002 | Pasquali |

(Continued)

*Primary Examiner* — Tadeese Hailu
(74) *Attorney, Agent, or Firm* — Jackson Walker L.L.P.

(57) ABSTRACT

A disclosed method of serving web page requests includes detecting a client request for a web page that contains an object. A preloader application is invoked to execute while the object is downloading to the client. The preloader application displays a preloader message during at least part of the downloading interval. At least a part of the preloader message is an advertisement or is otherwise unrelated to a progress of the downloading of the object. A size of the object may exceed a specified threshold and/or a type of the object may match any of a set of predetermined object types. The set of predetermined object types may include a Java® object type, a Flash® object type, or another object type suitable for implementing motion graphics. In some embodiments, the preloader application resides on a third party web site.

18 Claims, 5 Drawing Sheets

(56) References Cited

U.S. PATENT DOCUMENTS

| | | |
|---|---|---|
| 2002/0147788 A1 | 10/2002 | Nguyen |
| 2003/0028565 A1 | 2/2003 | Landsman et al. |
| 2003/0069888 A1 | 4/2003 | Pasquali |
| 2003/0115598 A1 | 6/2003 | Pantoja |
| 2003/0149697 A1 | 8/2003 | Pasquali |
| 2003/0208491 A1 | 11/2003 | Pasquali |
| 2003/0220984 A1 | 11/2003 | Jones et al. |
| 2004/0010546 A1 | 1/2004 | Klug et al. |
| 2004/0093563 A1 | 5/2004 | Pasquali |
| 2004/0128618 A1 | 7/2004 | Datta |
| 2004/0151403 A1 | 8/2004 | Scheier et al. |
| 2005/0066283 A1 | 3/2005 | Kanamaru |
| 2005/0091501 A1 | 4/2005 | Osthoff et al. |
| 2005/0228899 A1 | 10/2005 | Wendkos et al. |
| 2005/0267798 A1 | 12/2005 | Panara |
| 2006/0159366 A1 | 7/2006 | Darwish |
| 2006/0190808 A1 | 8/2006 | Balthaser |
| 2007/0038717 A1 | 2/2007 | Burkholder et al. |
| 2007/0067305 A1 | 3/2007 | Ives |
| 2007/0078951 A1 | 4/2007 | Murai et al. |
| 2008/0040127 A1 | 2/2008 | Williams et al. |
| 2008/0201332 A1 | 8/2008 | Souders et al. |
| 2008/0263192 A1 | 10/2008 | Murphy et al. |
| 2008/0294525 A1 | 11/2008 | Walk et al. |
| 2009/0019084 A1 | 1/2009 | Crandall et al. |
| 2010/0031366 A1 | 2/2010 | Knight et al. |
| 2011/0082754 A1 | 4/2011 | Shuster |

# PRELOADER EMPLOYING ENHANCED MESSAGES

The present patent application is a continuation of a previously filed patent application, U.S. patent application Ser. No. 11/948,354, filed Nov. 30, 2007, the entirety of which is hereby incorporated by reference. Pursuant to 37 CFR §1.78(a)(3), an application data sheet containing a reference to the previously filed application, unless submitted previously, is submitted contemporaneously herewith.

BACKGROUND

1. Field of the Disclosure

The present disclosure relates to web serving and more particularly to web serving pages that take a relatively long time to transfer to a client.

2. Description of the Related Art

Many websites include objects, including Java® objects, a registered trademark of Sun Microsystems, and Flash® objects, a registered trademark of Adobe Systems, that facilitate feature-rich animations and/or site navigation. Many of these objects are quite large and, therefore, require an extended period to download to a user's desktop where the objects can be played or otherwise executed.

DESCRIPTION OF THE EMBODIMENTS

Figure 1:
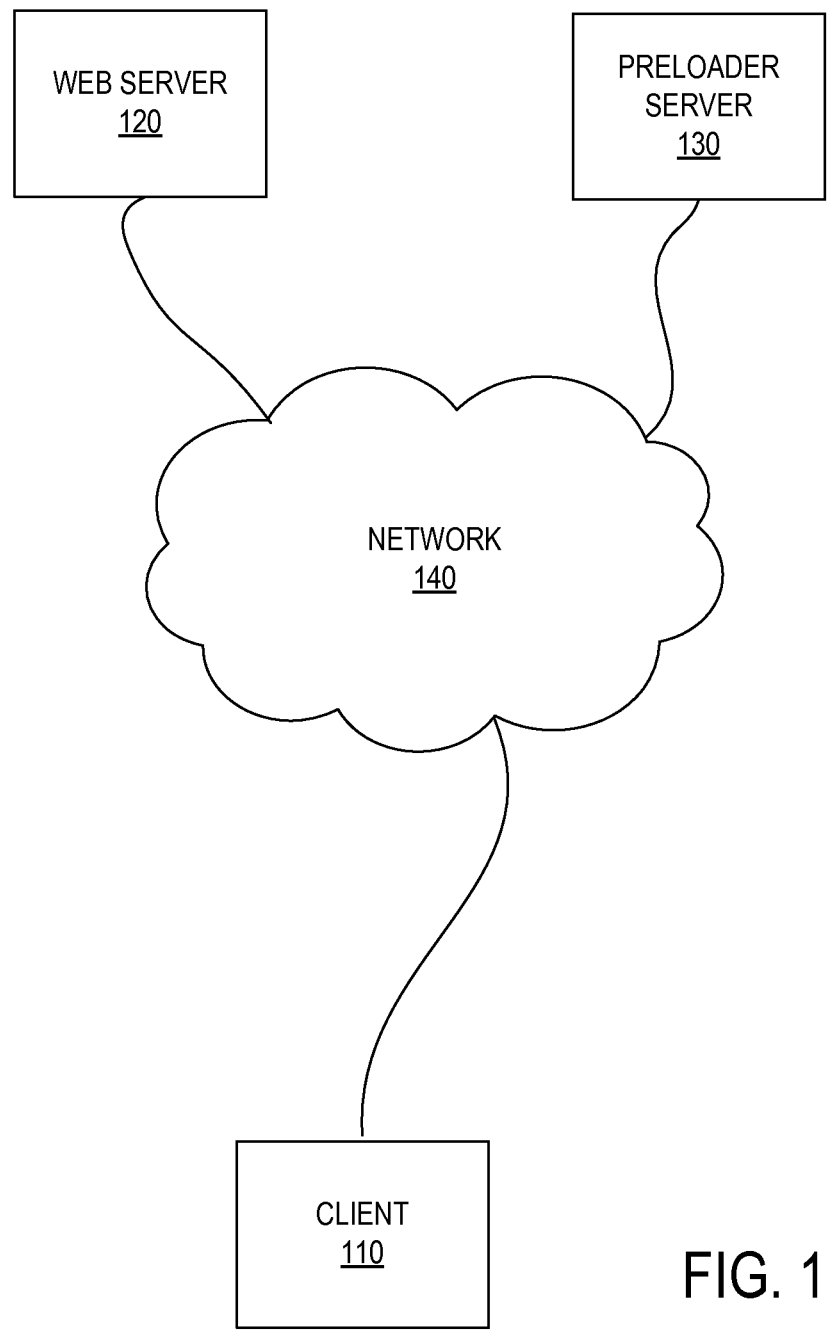
FIG. 1 is a block diagram of selected elements of a networked system for serving web pages.

In one aspect, a disclosed method of serving web page requests includes detecting a client request for a web page that contains an object. A preloader application is invoked to execute during at least part of a downloading interval during which the object is downloading to the client. The preloader application displays a preloader message during at least part of the downloading interval. At least a part of the preloader message is unrelated to the progress of the downloading of the object. A size of the object may exceed a specified threshold or a type of the object may match any of a set of predetermined object types. The set of predetermined object types may include a Java® object type, a Flash® object type, or another object type suitable for implementing motion graphics. In some embodiments, the preloader application resides on a third party web site. In these embodiments, invoking the preloader may include the web server requesting a universal resource locator of the third party web site. In some embodiments, the preloader messages may include an advertisement of a fourth party. The part of the preloader message unrelated to the progress may include an advertisement for goods or services. The preloader may play a series of preloader messages. The preloader may select the message(s) to play from a set of available messages based at least in part on an estimate of a time required to download the object. The selection of the message may be influenced by other factors including, as examples, the subject matter of the requested web page, a demographic characteristic of the client, the time of day, the time of year, the day of the week, and a geographic location of the client.

In another aspect, a disclosed computer program product includes computer executable instructions, stored on a computer readable medium, for serving web pages where the instructions include instructions to detect a preloader request from a web server where the preloader request is associated with an object in a web page requested by a client and served by the web server. The instructions further include instructions to play a preloader message that includes an advertisement while the web page object is downloading. The preloader message may be selected from a plurality of available preloader messages. The instructions may include instructions to select the preloader message based at least in part on an estimate of a time required to download the object. The instructions may further include instructions to detect completion of the preloader message, determine an estimate of a remaining time for downloading the object to the client, select a next preloader message to play based at least in part on the remaining time estimate, and play the selected next preloader message. The instructions may further include instructions to estimate a time required to download the object prior to playing the preloader message. The preloader message may include an advertisement for goods or services of a fourth party that is distinct from a party associated with the web server or a party associated with the preloader application. In some embodiments, the instructions may include instructions to play a progress item indicative of a progress of the downloading of the object. The preloader request may include the web server transmitting a request for a universal resource locator associated with the preloader application. The preloader application may be located remote to the web server.

In still another aspect, a disclosed service for processing web page requests includes providing a network accessible preloader application that is operable to respond to a preloader request from a web server by playing a preloader message during at least part of an interval during which an object is downloading to a client. At least part of the message includes an advertisement or is otherwise unrelated to the progress of downloading the object. The preloader may select the message from a plurality of available messages based on the time required to download the object or other factors. In some embodiments, the preloader application generates the estimate of the downloading duration. The preloader application in some cases may select and play multiple messages during the downloading. In some of these cases, the preloader application may select a second message after completion of the first message based at least in part on an estimate of time remaining to complete the download.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred to collectively as widgets 102 and any one of which may be referred to generically as a widget 102.

Referring now to the drawings, FIG. 1 depicts selected elements of an embodiment of a networked system 100. In the depicted embodiment, system 100 includes a client 110, a web server 120, and a preloader server 130 all connected to a network 140. In some embodiments, network 140 may include elements of a public network such as the Internet, a private network including Internet Protocol (IP) based private networks, or both.

Client 110, described in more detail below with respect to FIG. 2, may include a web browser or other application suitable for requesting a web page or other information from web server 120. Web server 120, described in more detail below with respect to FIG. 3, is operable to process web requests from clients and to provide requesting clients with web pages or other data applicable to the corresponding request. In some embodiments, preloader server 130 hosts a special purpose application, referred to herein as a preloader application, that is invoked by web server 120. Web server 120 may invoke preloader server 130 when a web page requested by client 110 from web server 120 includes an object that is suitable for invoking a preloader application.

In some cases, the types of objects that might cause web server 120 to invoke a preloader application of preloader server 130 include objects that are large and/or objects that are of a type that may require extended time to download to client 110. Examples of object types that may require extended download times include Flash® objects, Java® objects, and other objects that might support graphic animations, video presentation, and the like. When client 110 requests a web page from web server 120 and web server 120 determines that the requested web page includes an object suitable for preloading, web server 120 may issue a request to preloader server 130 to execute its preloader application. The request from web server 120 to preloader server 130 may include information from which the preloader application can determine the object subject to preloading.

Although FIG. 1 illustrates an embodiment in which preloader server 130 is remote and distinct from web server 120, other embodiments may integrate some or all elements of a preloader application into web server 120. The embodiment depicted in FIG. 1 is compatible with an implementation in which web servers, including web server 120, can invoke preloader services offered by a third party provider. This arrangement beneficially simplifies the effort required of web page and other developers to incorporate a preloader into their applications. A distributor of third party preloader applications may permit and encourage web page developers to incorporate relatively simple code segments to invoke the developer's preloader applications. The third party preloader applications distributor may then be free to offer services by way of the preloader application. For example, the third party may play advertisements or other content as part of the preloader application. The third party in such cases might obtain revenue from the entities that wish to have their advertisements play when a web server is downloading an extensive object.

Figure 2:
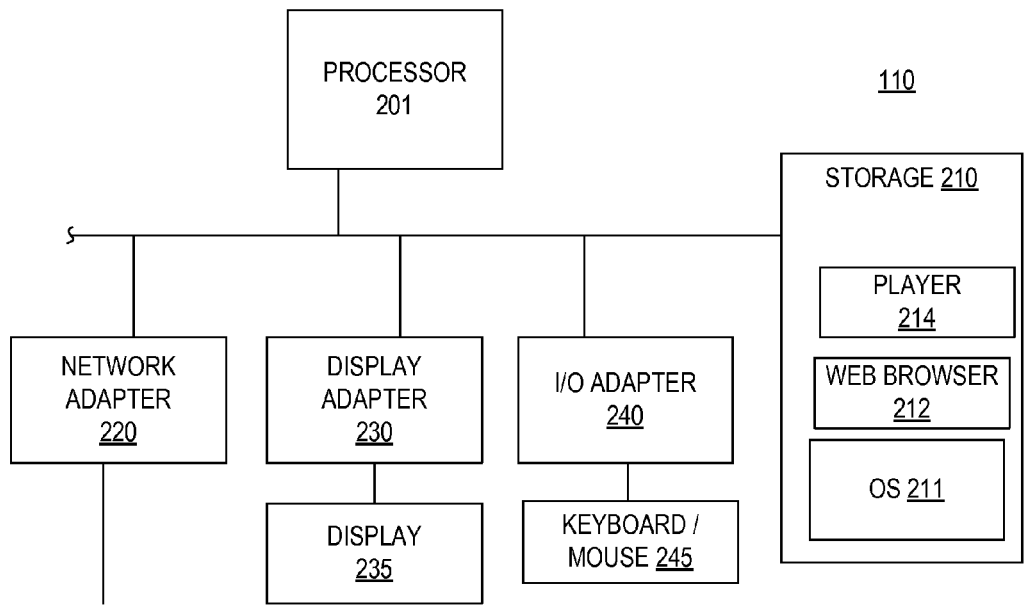
FIG. 2 is a block diagram of selected elements of an embodiment of the client of FIG. 1.
Figure 3:
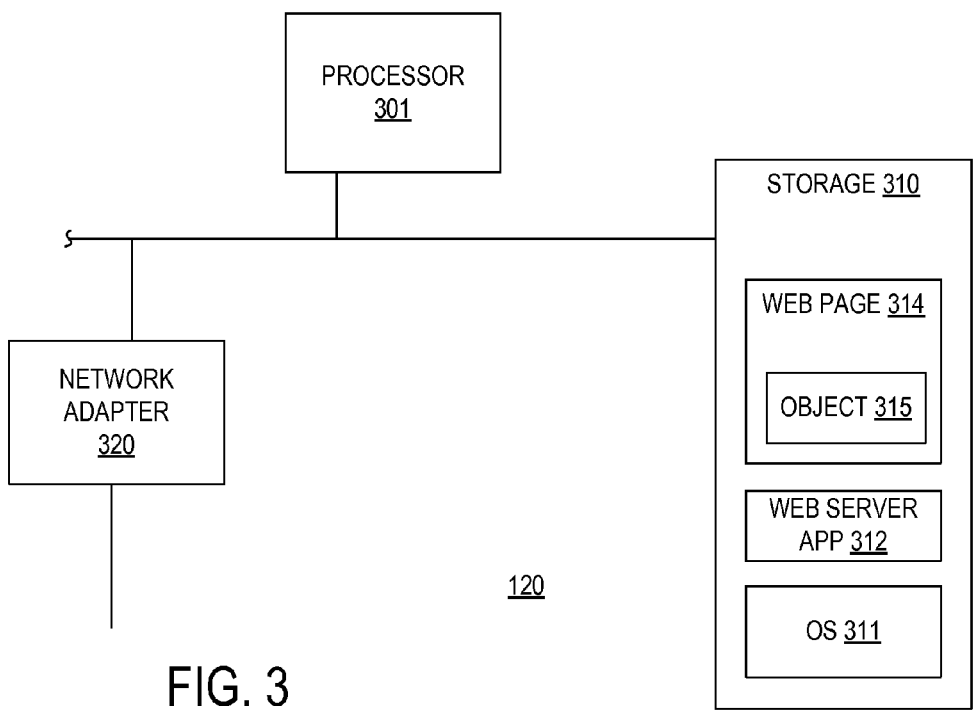
FIG. 3 is a block diagram of selected elements of an embodiment of the web server of FIG. 2.

Referring now to FIG. 2, selected elements of an embodiment of client 110 are illustrated. In the illustrated embodiment, web server 120 includes a processor 201 having access to a storage resource 210. Processor 201 may be implemented with a general purpose microprocessor such as in a desktop or notebook personal computer, an embedded processor such as in a personal digital assistant (PDA) or other mobile and network aware device, or another suitable processor device. Client 110 as shown further includes an I/O adapter 240 supporting communication with a keyboard and a mouse or pointing device, collectively represented by reference numeral 245 and a display adapter 230 connected to a display device 235. A network adapter 220 is operable to connect client 110 to an external network including the network 140 depicted in FIG. 1.

The storage resource 210 of client 110 may include a volatile portion including a portion of Random Access Memory as well as a non volatile portion including magnetic disks, optical disks, floppy disks, magnetic tapes, Read Only Memory devices, flash memory devices, and the like. Storage resource 210 may include computer software modules in the form of computer executable instructions stored on the storage resource. Client 110 as depicted includes software modules stored in storage 210. The software modules include a client operating system (OS) 211 and a web browser 212. OS 211 supports memory management, program scheduling, and other functions of client 110. OS 211 is exemplified by commercially distributed operating systems such as the Windows® family of operating systems from Microsoft although other operating systems including Unix based operating systems may be used. Web browser 212 encompasses conventional and pervasive web browser applications for enabling users to "surf" a network such as the Internet by providing a graphical user interface that enables users to generate Hypertext Transfer Protocol (HTTP) requests. An example of an application suitable for use as web browser 212 is the Internet Explorer browser from Microsoft.

Referring now to FIG. 3, selected elements of an embodiment of the web server 120 of FIG. 1 are shown. In the depicted embodiment, web server 120 includes a processor 301 connected and having access to a storage resource 310. The processor 301 is further connected to network adapter 320. Network adapter 320, like network adapter 220 in FIG. 2, enables web server 120 to communicate with the network 140. Storage resource 310, like storage resource 210, may include volatile and nonvolatile storage media. Storage 310 includes a web server operating system 311, a web server application 312, and a web page 314 that includes an object 315. Operating system 311 may be any suitable server class operating system including Unix compliant and Unix-like operating systems including Linux and Linux derivative operating system. Web server application 312 may include elements of commercially distributed web servers such as an Apache HTTP Server application. Web server application 312 may, however, include additional elements including, for example, functionality to invoke a resident or third party preloader application when a requested web page being served by the web server application includes an object that is suitable for employing a preloader application.

In the embodiment depicted in FIG. 3, storage resource 310 includes a web page 314 that includes a web object 315 or, more simply, object 315. Depending upon the implementation, object 315 may represent a relatively large, e.g., greater than 1 MB, file or object such as a Flash® object or a Java® object that "executes" in conjunction with a plug in or stand alone "player" application 214 that is resident on client 110. When a client such as client 110 requests web page 314 from web server 120, web server 120 may begin the process of downloading or otherwise transferring the object 315 to client 110 so that the client's player 214 can play the object and the user can view the web page as it was designed to be viewed.

Web server application 312 may include the ability to invoke a preloader application when appropriate. For example, web server application 312 may invoke a preloader whenever a client requests a web page that includes an object that is greater than a specified size threshold or whenever the client requests a web page that includes an object of a certain type such as a Flash® type object, a Java® type object, or another object type suitable for generating animations and the like. In some embodiments, web server application 312 invokes a preloader application, but initiates the transfer of object 315 to client 110 by itself, either before or after invoking the preloader application. In other embodiments, web server application 312 may simply invoke the preloader application by specifying the object to be transferred and a destination address, i.e., the client's IP or other network address. In such cases, the preloader application may be responsible for actual initiation of the download or transfer of object 315 to client 110.

Figure 4:
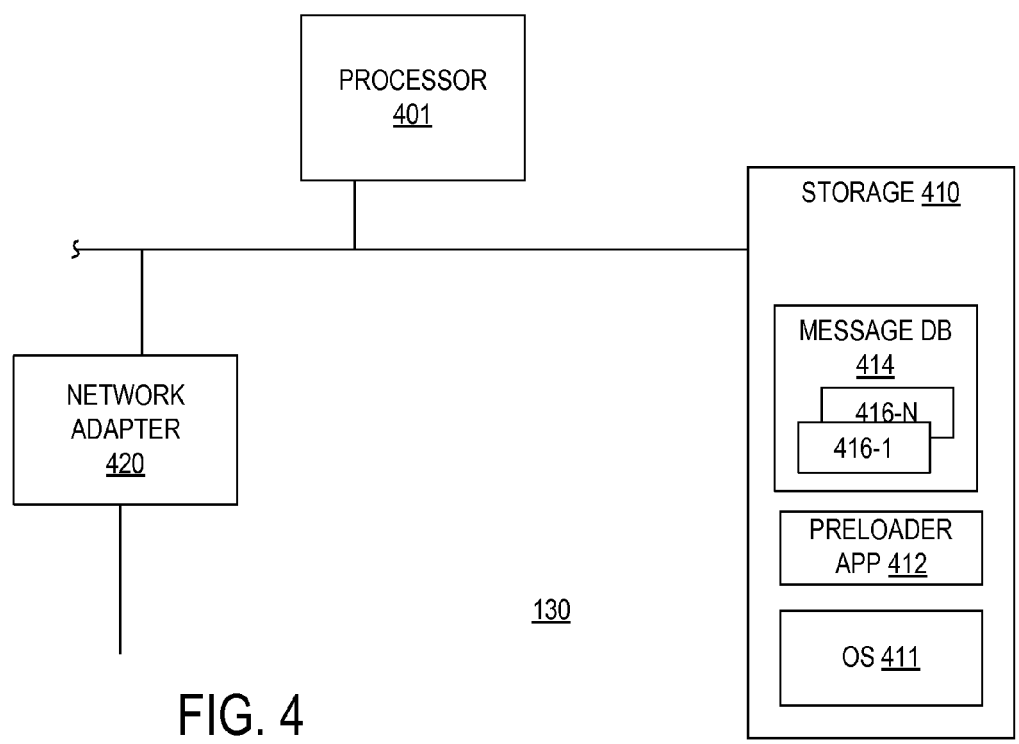
FIG. 4 is a block diagram of selected elements of an embodiment of the preloader server of FIG. 1.

Referring now to FIG. 4, selected elements of an embodiment of preloader server 130 are shown. In the depicted implementation, preloader server 130, like web server 120, includes a processor 401 connected to a network adapter 420 and a storage resource 410. Storage resource 410 as shown includes an operating system 411 and a preloader application 412. OS 411 may be implemented with any suitable server class operating system including, for example, a Unix operating system or a Unix derivative operating system. Preloader application 412 as depicted in FIG. 4 has access to a data structure identified as message database 414. Message database 414 may contain one or more messages 416-1 through 416-N of varying lengths, formats, and subject matters. Messages 416 may include, as an example, a commercial advertisement for goods or services. The goods or services may be the goods or services of an entity affiliated with preloader server 130, an entity affiliated with web server 120, or an entity not affiliated with either. An entity not affiliated with either web server 120 or preloader server 130 is referred to herein as a "fourth" party entity to emphasize the web server as the second party and the preloader application as the third party.

Some embodiments of the web serving features described herein are implemented as computer software modules which include computer executable instructions that reside in a computer readable storage medium such as the storage resources 210, 310, and/or 410. When these computer software modules are executed, they cause one or more servers or other devices to perform methods that can be represented as flow diagrams.

Figure 5:
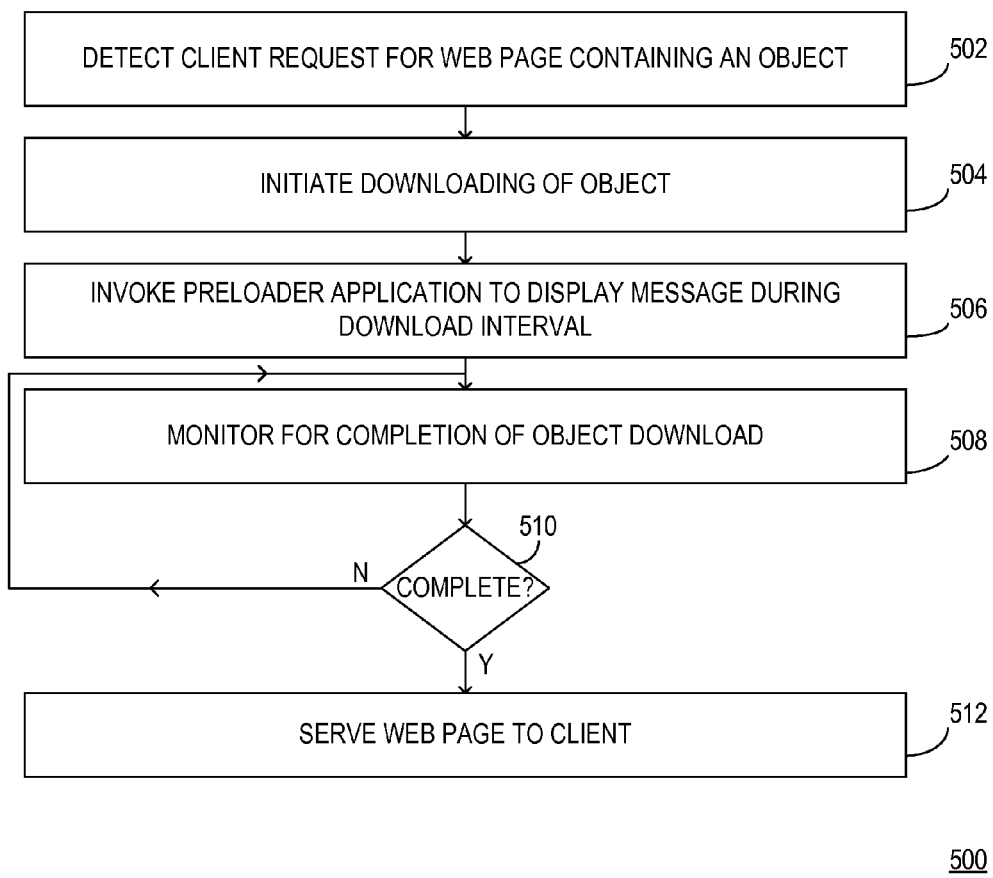
FIG. 5 is a flow diagram of selected elements of an embodiment of a web serving method.

Referring now to FIG. 5, a flow diagram depicts selected elements of an embodiment of a method 500 for serving a web page. In the depicted embodiment, method 500 includes a web server such as web server 120 detecting (block 502) a client request for a web page where the requested web page includes an object that may require considerable time to download to the client. In the depicted embodiment, method 500 includes initiating (block 504) the downloading of the object to the client. In other embodiments, initiation of the actual downloading of the object may be delegated to the preloader application.

In the depicted embodiment, method 500 includes invoking (block 506) a preloader application to display one or more messages during the download interval, i.e., the time during which the object is downloading to the client. In some implementations, block 506 includes web server 120 determining whether an object in a requested web page justifies invoking a preloader application by determining if the object meets certain criteria. For example, web server 120 may apply size and/or type criteria to an object to determine if the object justifies invoking a preloader application. In such embodiments, web server 120 may compare the size of the object against a predetermined threshold and/or compare the type of object against a set of pre-identified object types including, as examples, Flash® objects and Java® objects. If the object meets one or more of the criteria, the method 500 invokes the preloader application.

As indicated previously, the preloader application may be resident on web server 120 or remotely located on a third party preloader server 130. In cases where the preloader application is hosted on a third party preloader server, invoking the preloader application may include web server 120 acting as a client and issuing a web request to preloader server 130 to invoke the preloader application. For example, web server 120 may invoke the preloader application by transmitting a uniform resource locator identifying the preloader server and/or the preloader application hosted therein.

In some embodiments, the message(s) displayed when the preloader application is invoked include(s) at least one message or message portion that is unrelated to the progress of the downloading of the object to the client. Conventional applications for downloading large files may include an hour glass or other information that attempts to indicate progress of the download including, for example, how much time remains until the download is complete. While the preloader application described herein may display information indicative of the download progress, it may also display commercial advertisements or other messages unrelated to the progress of the download.

After method 500 as shown in FIG. 5 invokes the preloader in block 506, it monitors (block 508) for completion of the object download. When the downloading of the object is complete as determined in block 510, method 500 includes serving (block 512) the web page, including the object, to the client to fulfill the client request.

Figure 6:
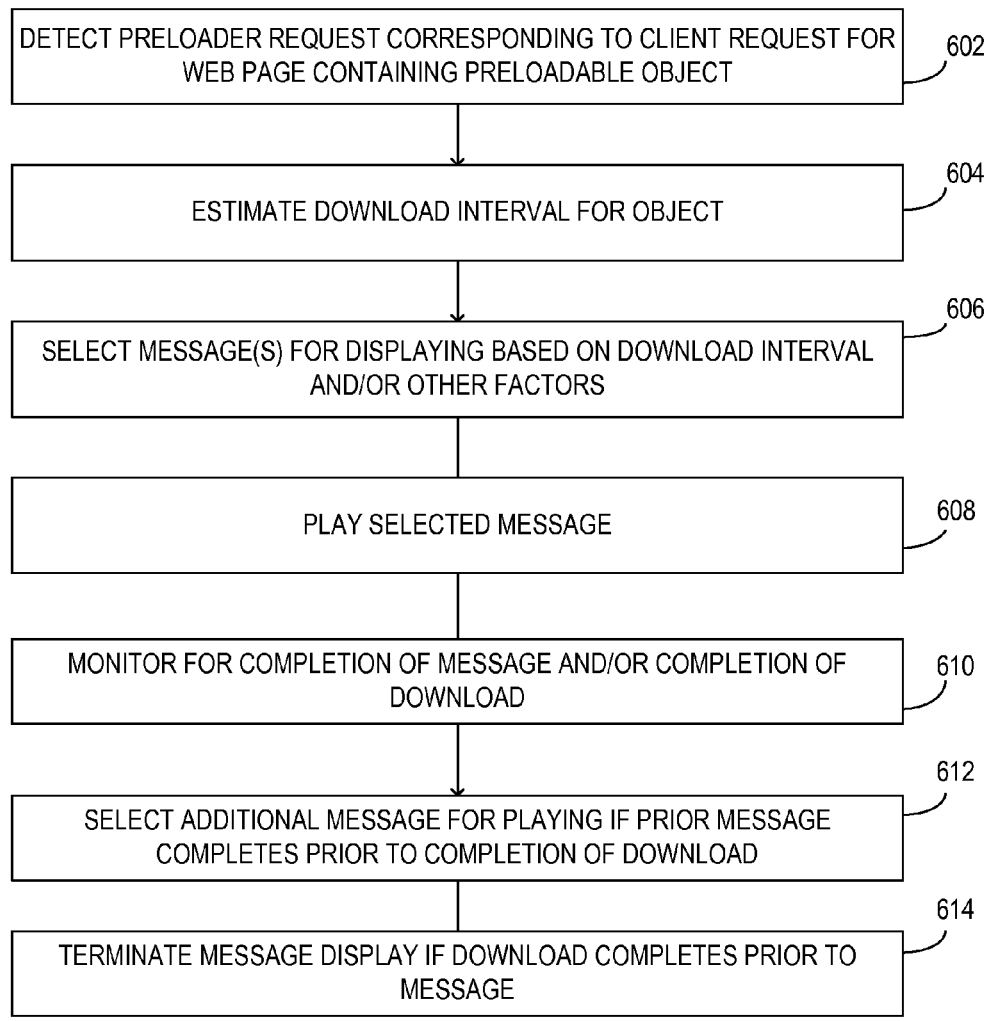
FIG. 6 is a flow diagram of selected elements of an embodiment of a preloader method.

Referring now to FIG. 6, selected elements of an embodiment of a preloader method 600 employed by a preloader application are presented. Preloader method 600 may represent an application hosted on or otherwise executing on a third party preloader server 130 or executing on web server 120 itself. In the embodiment depicted in FIG. 6, preloader method 600 detects (block 602) a preloader request issued by web server 120. The detected preloader request corresponds to a client request for a web page that contains an object appropriate for using a preloader application. Such objects are referred to in FIG. 6 as "preloadable" objects, which may include large objects and/or Flash® objects, Java® objects, or other objects of specific types.

As depicted in FIG. 6, preloader method 600 includes estimating (block 604) a download interval for the preloadable object. In some embodiments, the web server's preloader request may include information from which the method 600 may estimate the download interval directly. This information might include the size of the preloadable object, the destination of the object, and possibly an estimated bandwidth for a connection between the web server and the client. In other embodiments, the preloader application may receive the download interval estimate from a calculation made by the web server. In this case, the estimated download interval is simply passed to the preloader application as a parameter.

In block 606, preloader method 600 as shown includes selecting one or more messages for displaying. In the illustrated implementation, the selection of messages is based at least in part on the estimated download interval, possibly in conjunction with other factors. For example, the selection of messages may be based partly on a comparison between the length of a particular message and the estimated download interval. If the length of a message is longer than the estimated download interval, preloader method 600 may exclude the particular message as a candidate. If a message is relatively short compared to the estimated download interval, the preloader application may select multiple messages and display them sequentially. In still other embodiments, the selection of messages may be based on factors such as demographic information associated with the client, if known, the subject matter with which the requested web page is concerned, the time of day, the day of the year, the day of the week, a geographic indication of the client, and so forth. Using these other factors, commercial advertisements and other messages may be targeted to be of particular interest to the user.

After selecting one or more messages, preloader method 600 as shown includes playing (block 608) the selected message or messages. In some embodiments, the messages are relatively short such as banner ads that are lightweight and that load and execute quickly. The messages played in block 608 may be of any suitable format including, as examples, audio files, video files, multimedia files, images, and so forth. Preloader method 600 as depicted then monitors (block 610) for completion of a message being played and for completion of the download. If a message completes before the download completes preloader method 600 may select and play an additional message in block 612. The selection of an additional message may include, for example, determining an estimate of the remaining download interval and selecting a message based in part on the estimate. Preloader method 600 as shown further includes terminating (block 614) or otherwise aborting the message playing if the preloader application determines that the downloading of the object has completed prior to the end of the current message.

In embodiments where the preloader server determines the selection of messages, advertisers may contract with the preloader server operator for placing advertisements. The preloader server operator may then simplify and freely distribute the code necessary to incorporate a preloader request into a particular web page or other document. This implementation model will provide the web page developers with an easy to incorporate and free or inexpensive preloader while enabling the preloader server operator to realize revenue from the advertising.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of processing web page requests, the method comprising:
   responsive to detecting, by a web server, a client request for a web page containing a preloadable object, initiating a download of the object to the client;
   before the download completes, invoking a preloader application to perform operations including:
      selecting a preloader message from a set of available messages based at least in part on:
         a size of the object;
         demographic information associated with the client;
         subject matter with which the requested web page is concerned;
         a time of day; and
         a day of the week; and
      displaying the preloader message with an indication of a progress of the download wherein at least a part of the preloader message is unrelated to a progress state of the downloading of the object;
   monitoring for completion of the download; and
   responsive to detecting completion of the preloader message prior to completion of the download, selecting and displaying an additional message.

2. The method of claim 1, wherein the invoking of the preloader application occurs in response to a size of the object exceeding a specified threshold.

3. The method of claim 2, wherein a type of the object is a type suitable for implementing motion graphics.

4. The method of claim 1, further comprising estimating a download interval for the object wherein the download interval indicates a time interval required to complete the download of the object.

5. The method of claim 1, wherein the part of the preloader message unrelated to the progress of the serving of the web page includes an advertisement.

6. The method of claim 5, wherein the invoking of the preloader application includes requesting, by the web server, a third party server to invoke the preloader application.

7. The method of claim 6, wherein the invoking of the preloader application includes the web server indicating a universal resource locator of the third party server.

8. The method of claim 1, wherein the preloader application displays a plurality of preloader messages to the client before the download completes.

9. A non-transitory computer readable medium including computer executable instructions that, when executed by a computer, cause the computer to perform operations comprising:
   responsive to detecting, by a web server, a client request for a web page containing a preloadable object, initiating a download of the object to the client;
   before the download completes, invoking a preloader application to perform operations including:
      selecting a preloader message from a set of available messages based at least in part on:
         a size of the object;
         demographic information associated with the client;
         subject matter with which the requested web page is concerned;
         a time of day; and
         a day of the week; and
      displaying the preloader message with an indication of a progress of the download wherein at least a part of the preloader message is unrelated to a progress state of the downloading of the object;
   monitoring for completion of the download; and
   responsive to detecting completion of the preloader message prior to completion of the download, selecting and displaying an additional message.

10. The non-transitory computer readable medium of claim 9, wherein the invoking of the preloader application occurs in response to a size of the object exceeding a specified threshold.

11. The non-transitory computer readable medium of claim 10, wherein a type of the object is a type suitable for implementing motion graphics.

12. The non-transitory computer readable medium of claim 9, wherein the part of the preloader message unrelated to the progress of the serving of the web page includes an advertisement.

13. The non-transitory computer readable medium of claim 12, wherein the invoking of the preloader application includes requesting, by the web server, a third party server to invoke the preloader application.

14. The non-transitory computer readable medium of claim 13, wherein the invoking of the preloader application includes the web server indicating a universal resource locator of the third party server and wherein the advertisement includes an advertisement of a fourth party.

15. The non-transitory computer readable medium of claim 9, wherein the preloader application displays a plurality of preloader messages to the client before the serving of the web page completes.

16. A preloader server, comprising:
a processor;
a storage medium, accessible to the processor, including processor executable instructions that, when executed by the processor, cause the processor to perform operations comprising:
responsive to detecting, by a web server, a client request for a web page containing a preloadable object, initiating a download of the object to the client;
before the download completes, invoking a preloader application to perform operations including:
selecting a preloader message from a set of available messages based at least in part on:
a size of the object;
demographic information associated with the client;
subject matter with which the requested web page is concerned;
a time of day; and
a day of the week; and
displaying the preloader message with an indication of a progress of the download wherein at least a part of the preloader message is unrelated to a progress state of the downloading of the object;
monitoring for completion of the download; and
responsive to detecting completion of the preloader message prior to completion of the download, selecting and displaying an additional message.

17. The preloader server of claim 16, wherein the preloader message comprises an advertisement.

18. The preloader server of claim 16, wherein the preloader message includes a first message and wherein the operations include:
after completion of the first message, selecting a second message based at least in part on an estimate of time remaining to download the object.

* * * * *